(12) United States Patent
Lai et al.

(10) Patent No.: US 10,666,186 B2
(45) Date of Patent: May 26, 2020

(54) MOVABLE SOLAR POWER APPARATUS

(71) Applicants: Austin Lai, Taichung (TW); Kai-Yang Cheng, Taichung (TW); Wei-Fu Hsu, Taichung (TW)

(72) Inventors: Austin Lai, Taichung (TW); Kai-Yang Cheng, Taichung (TW); Wei-Fu Hsu, Taichung (TW)

(73) Assignee: AVERTRONICS INC., Taichung (TW)

( * ) Notice: Subject to any disclaimer, the term of this patent is extended or adjusted under 35 U.S.C. 154(b) by 172 days.

(21) Appl. No.: 16/017,884

(22) Filed: Jun. 25, 2018

(65) Prior Publication Data
US 2019/0393826 A1 Dec. 26, 2019

(51) Int. Cl.
| | |
|---|---|
| H02S 10/40 | (2014.01) |
| H02S 40/38 | (2014.01) |
| H02S 40/32 | (2014.01) |
| H02S 20/30 | (2014.01) |
| H02J 3/38 | (2006.01) |
| H02J 9/06 | (2006.01) |

(Continued)

(52) U.S. Cl.
CPC .............. *H02S 10/40* (2014.12); *H02J 3/385* (2013.01); *H02J 7/0029* (2013.01); *H02J 7/35* (2013.01); *H02J 9/06* (2013.01); *H02S 20/30* (2014.12); *H02S 40/32* (2014.12); *H02S 40/38* (2014.12); *H05B 45/00* (2020.01); *H02J 7/00302* (2020.01); *H02J 7/00306* (2020.01); *H05B 45/37* (2020.01)

(58) Field of Classification Search
CPC .......... H02S 40/38; H02S 40/34; H02S 20/22; H02S 20/30; H02S 10/40; H02S 30/20; H02J 7/00; H02J 7/35; H02H 7/18

USPC ................................ 307/20, 80, 9.1, 10.1, 30
See application file for complete search history.

(56) References Cited

U.S. PATENT DOCUMENTS

| | | | |
|---|---|---|---|
| 9,252,680 B2 * | 2/2016 | Huang | .................... H02J 3/383 |
| 2008/0084178 A1 * | 4/2008 | Dowd | ................... H01M 10/42 |
| | | | 320/101 |

(Continued)

FOREIGN PATENT DOCUMENTS

| | | | | |
|---|---|---|---|---|
| WO | WO-2015101315 A1 * | 7/2015 | ............. | H02S 40/34 |
| WO | WO-2017139950 A1 * | 8/2017 | ............. | H02S 10/00 |

*Primary Examiner* — Rexford N Barnie
*Assistant Examiner* — Jagdeep S Dhillon
(74) *Attorney, Agent, or Firm* — Che-Yang Chen; Law Office of Michael Chen

(57) ABSTRACT

A movable solar power apparatus may comprise at least a solar panel set electrically connected to a maximum power point tracking system (MPPT). A lithium battery set is electrically connected to a battery management system (BMS) which is adapted to monitor and protect the lithium battery set, and the BMS is electrically connected to the MPPT to enable power generated by the solar panel set to directly charge the lithium battery set. A low potential wake-up circuit has a double-contact relay and a single-contact relay, and the double-contact relay comprises a main contact, a first contact, and a second contact. The main contact is switchably electrically connected to the first contact or the second contact, and the main contact is electrically connected to the BMS while the first contact is electrically connected to the master control circuit, and the MPPT is electrically connected to the BMS under normal condition.

10 Claims, 8 Drawing Sheets

(51) Int. Cl.
 *H02J 7/35* (2006.01)
 *H02J 7/00* (2006.01)
 *H05B 45/00* (2020.01)
 H05B 45/37 (2020.01)

(56) References Cited

U.S. PATENT DOCUMENTS

| | | | |
|---|---|---|---|
| 2015/0008865 A1* | 1/2015 | Wang | H05B 45/37 |
| | | | 320/101 |
| 2016/0322826 A1* | 11/2016 | Okino | H02J 13/0013 |
| 2017/0264237 A1* | 9/2017 | La Due | H01L 31/042 |
| 2018/0094448 A1* | 4/2018 | Davis | E04H 15/06 |
| 2019/0149084 A1* | 5/2019 | Williams | H01L 31/048 |
| | | | 136/251 |

* cited by examiner

MOVABLE SOLAR POWER APPARATUS

FIELD OF THE INVENTION

The present invention relates to a solar power apparatus and more particularly to a movable solar power apparatus.

BACKGROUND OF THE INVENTION

Solar power is a kind of clean, pollution-free renewable energy, which has been the development trend of energy for next generation. One key technique commonly used for solar energy collection is maximum power point tracking (MPPT) which is configured to maximize power extraction under all conditions. The efficiency of power transfer from the solar panel depends on both the amount of sunlight falling on the solar panel and the electrical characteristics of the load. The load characteristic that provides the maximum power transfer efficiency is changed with sunlight exposure such that people can acquire the maximum power transfer efficiency through MPPT technique. Moreover, the solar panel cannot store electricity so that the solar panel usually connects to a lithium battery for electricity storage. Since lithium battery is easily broken when overcharging or over-discharging, it usually uses with battery management systems (BMS). During charge or discharge process, BMS is configured to monitor lithium batteries conditions including terminal voltage, temperature, charge and discharge current, and total voltage, and in order to prevent lithium batteries from being damaged by overcharging or over-discharging, BMS has the function of cutting off circuit of the system.

However, the conventional solar power apparatus is disadvantageous because: since BMS is configured to cut off circuit of the system when the lithium batteries are at low electrical potential due to over-discharging, and meanwhile the MPPT system is adapted to stop charging the lithium batteries. In this moment, the lithium batteries can only be charged by external battery which is manually connected by personnel, and the solar panel can only back to normal status until the lithium batteries are charged to normal electrical potential. Therefore, there remains a need for a new and improved design for a movable solar power apparatus to overcome the problems presented above.

SUMMARY OF THE INVENTION

The present invention provides a movable solar power apparatus which comprises at least a solar panel set. The solar panel set is electrically connected to a maximum power point tracking system (MPPT), and the MPPT is electrically connected to a master control circuit and at least a DC load. The solar panel set is configured to generate direct current (DC), and MPPT is adapted to convert the generated DC so as to provide power to the DC load. A lithium battery set is electrically connected to a battery management system (BMS), and the BMS is configured to monitor and protect the lithium battery set from overcharging and over-discharging. A low potential wake-up circuit has a double-contact relay and a single-contact relay, and the double-contact relay comprises a main contact, a first contact, and a second contact. The main contact is switchably electrically connected to the first contact or the second contact, and the main contact is electrically connected to the BMS while the first contact is electrically connected to the master control circuit, and the MPPT is electrically connected to the BMS under normal condition. Furthermore, the single-contact relay is electrically connected to the solar panel set at one end and electrically connected to the second contact at the other end. When the main contact and the first contact of the double-contact relay is electrically connected, the single-contact relay is configured to cut off the low potential wake-up circuit. On the other hand, when the double-contact relay switches its electrical connection to enable the main contact to electrically connect to the second contact, the single-contact relay is adapted to be electrically connected to the low potential wake-up circuit. A zero potential wake-up circuit comprises a zero potential relay, and two ends thereof are respectively electrically connected to a UPS system and the master control circuit. When the lithium battery set is completely out of electricity, the double-contact relay is configured to keep the main contact electrically connecting to the first contact, and the UPS system is adapted to provide power to the zero potential relay so as to wake up the MPPT and the BMS. An inverter electrically connected to the master control circuit is configured to convert DC from the lithium battery set to alternating current (AC). Also, the inverter is adapted to electrically connect to at least an output connector to provide AC load for external supply.

In one embodiment, the inverter is electrically connected to an input connector which is configured to electrically connect to external AC, and the inverter is adapted to convert the external AC to DC, thereby charging the lithium battery set; when the lithium battery set is completely out of electricity, the UPS system is adapted to reboot the inverter and the BMS so as to convert external AC to DC to charge the lithium battery set.

In another embodiment, the lithium battery set is installed in a box which is secured on a trailer; the trailer comprises a plurality of wheels to enable the trailer to be movable, and the box is also provided for accommodating the MPPT, the DC load, the low potential wake-up circuit, the BMS, the UPS system, and the inverter.

In still another embodiment, a foldable pulling bar extended from an end of the trailer has an auxiliary wheel such that a user is configured to pull the pulling bar to move the trailer; each of four corners of the trailer has a manual supporter and an elevated rack, and the manual supporter is adapted to be extended and firmly stand on the floor while the elevated rack is configured to lift the trailer so as to enable a stacker to move the trailer.

In a further embodiment, the DC load is electrically connected to a plurality of lighting units, and the MPPT is configured to directly provide 48V DC to each of the lighting units; the lighting units are installed at an upper end of a telescopic column while a lower end of the telescopic column is secured on the trailer, and a rope puller installed on the telescopic column is adapted to control the telescopic motion of the telescopic column.

In still a further embodiment, a plurality of upright posts are formed at a periphery of the box, and the solar panel set are installed at upper ends of the upright posts and positioned above the box, and each of pneumatic rods installed between the upright post and the solar panel set is adapted to push and position the solar panel set on the same plane.

In an advantageous embodiment, the DC load comprises a DC-DC converter which is configured to convert input DC to 12V DC, and a monitors system is electrically connected to the DC load through the DC-DC converter to get power.

In another advantageous embodiment, the monitors system is electrically connected to an internet sharer, a wireless router, and a monitor host in series, and the monitor host is electrically connected to the DC-DC converter; the internet sharer is adapted to converge image signals from the monitors system, and through the wireless router, the image signals are configured to be saved in the monitor host and to be transmitted to a connected device, thereby achieving the monitoring effect.

In a preferred embodiment, the wireless router is electrically connected to a GPS system which is adapted to locate the GPS coordinates of the movable solar power apparatus.

In another preferred embodiment, the output connector of the inverter is adapted to provide 220V AC to an electric car for power supply.

Comparing with conventional solar power apparatus, the present invention is advantageous because: (i) when the lithium battery set does not provide power to the double-contact relay, the double-contact relay is adapted to switch its electrical connection to enable the main contact to electrically connect to the second contact, and DC generated from the solar panel set is configured to pass through the single-contact relay of the low potential wake-up circuit, thereby waking up the BMS and charging the lithium battery set through the low potential wake-up circuit; when the lithium battery set is charged back to normal electrical potential and free from the over-discharging protection from the BMS, the double-contact relay is configured to switch back its electrical connection to enable the main contact to electrically connect to the first contact, thereby rebooting the MPPT and the inverter; (ii) in case that the low potential wake-up circuit cannot enable the solar panel set to directly charge the lithium battery set; since one end of the zero potential relay of the zero potential wake-up circuit is electrically connected to the UPS system while the other end thereof is electrically connected to the master control circuit; when the UPS system detects the lithium battery set is completely dead, the main contact is electrically connected to the first contact, and electricity stored in the UPS system is adapted to pass through and provide power to the zero potential relay, thereby waking up the BMS, the MPPT and the inverter, and the solar panel set is configured to charge the lithium battery set until the voltage difference between the solar panel set and the lithium battery set cuts off the zero potential wake-up circuit; (iii) With the pulling bar, the auxiliary wheel, and the wheels, the trailer can be moved easily to a power shortage location such as hills, coastal areas and emergency sites, and be secured at a position through the manual supporters; (iv) a user can turn on the monitors system and the GPS system, and check power generation and electricity information through the control cabinet, and through the wireless router connected to the mobile device, the user also can have real-time image signals on the mobile device, thereby achieving the monitoring effect; (v) when the movable solar power apparatus is under a poor lighting environment, the rope puller is operated to extend the telescopic column so as to raise the lighting units to light up the environment, thereby getting better images from the monitors system; (vi) the DC load is adapted to enable the movable solar power apparatus to achieve the effect of real-time monitoring, GPS locating, wireless network sharing and environment lighting, and through controlling MPPT, the movable solar power apparatus can have direct current from the solar panel set or the lithium battery set to improve the electricity efficiency and realize the functions mentioned above; (vii) through the input connector thereof connecting to external AC, the inverter is configured to convert input AC to DC for power demand of the movable solar power apparatus, and also the inverter comprises the output connector which is configured to electrically connect to an external device such as the electric car, and the inverter is adapted to convert DC from the solar panel set or the lithium battery set to 110V or 220V AC, thereby providing power to the external device through the output connector.

DETAILED DESCRIPTION OF THE INVENTION

Figure 1:
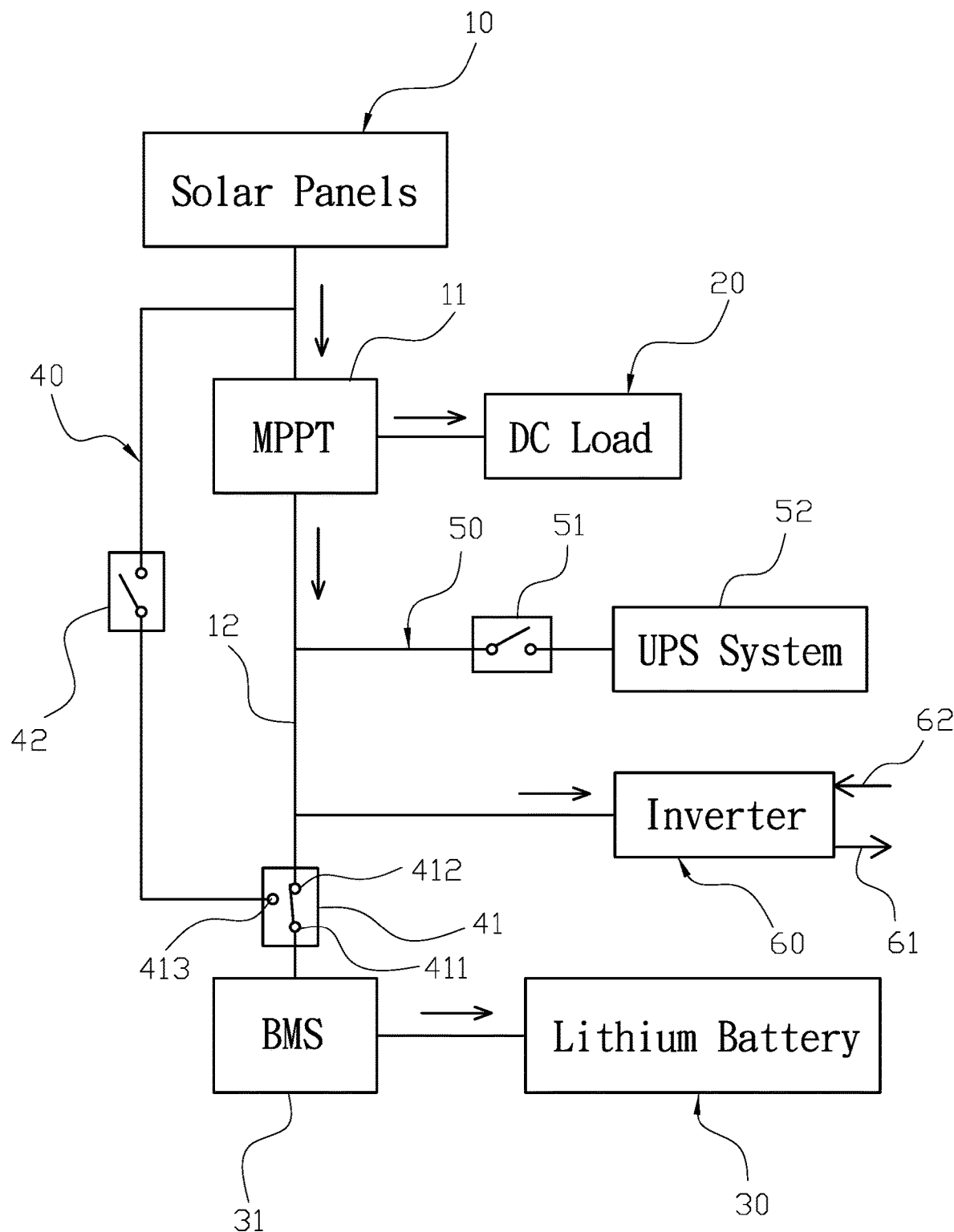
FIG. 1 is a circuit diagram of a movable solar power apparatus of the present invention.
Figure 2:
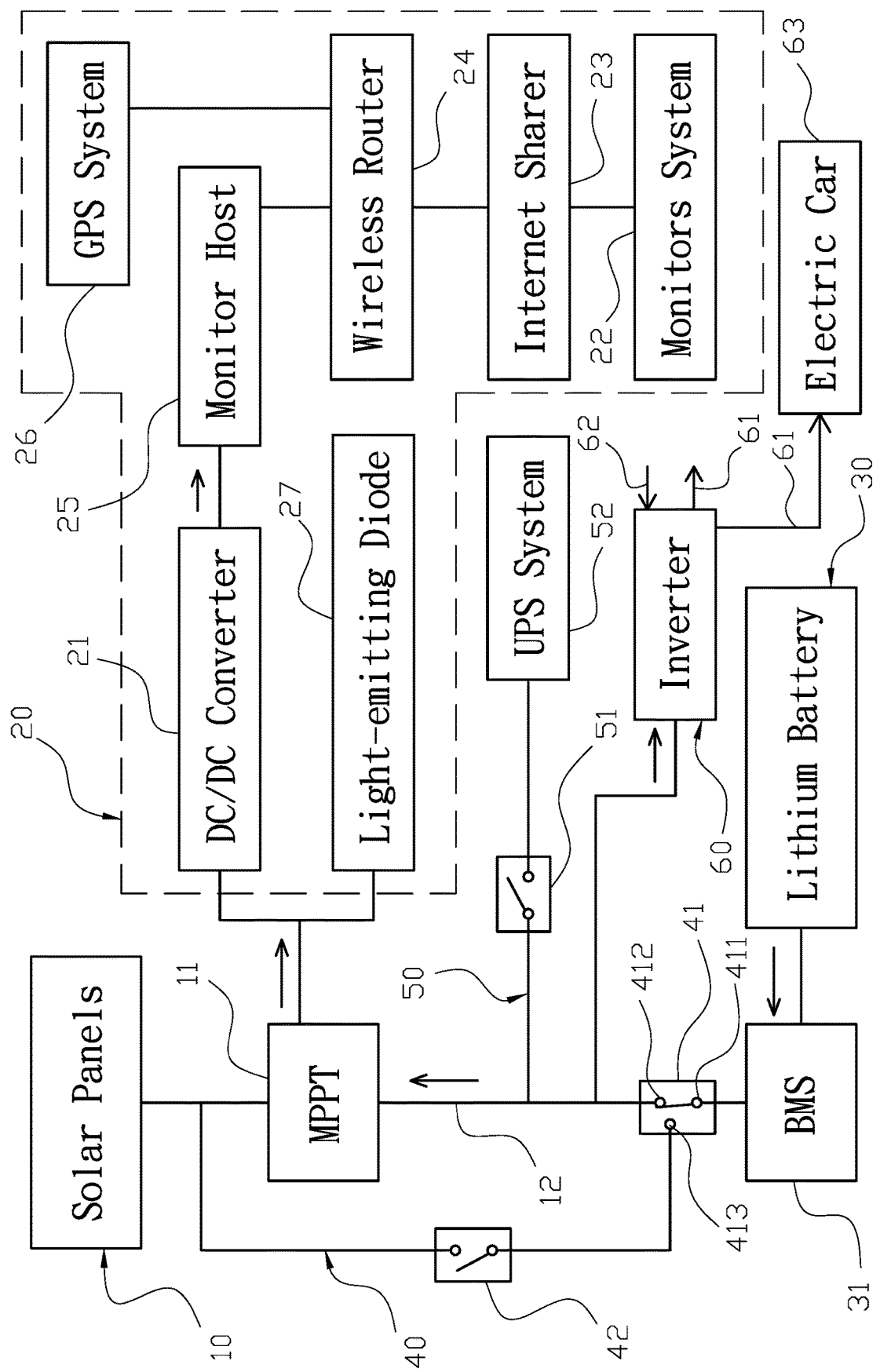
FIG. 2 is a circuit diagram of the movable solar power apparatus of the present invention when a lithium battery set is under normal use condition.
Figure 3:
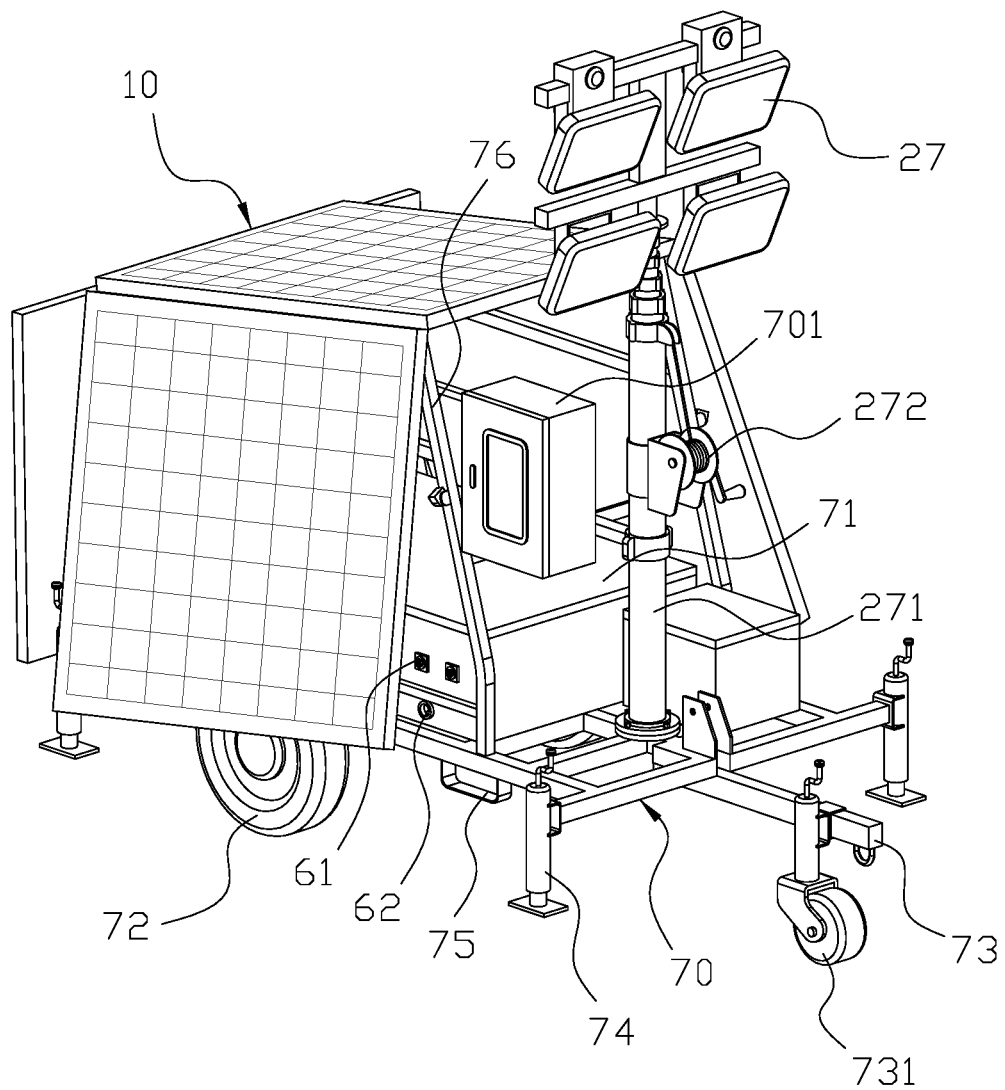
FIG. 3 is a three-dimensional assembly view illustrating a trailer enables the movable solar power apparatus of the present invention to be movable.
Figure 4:
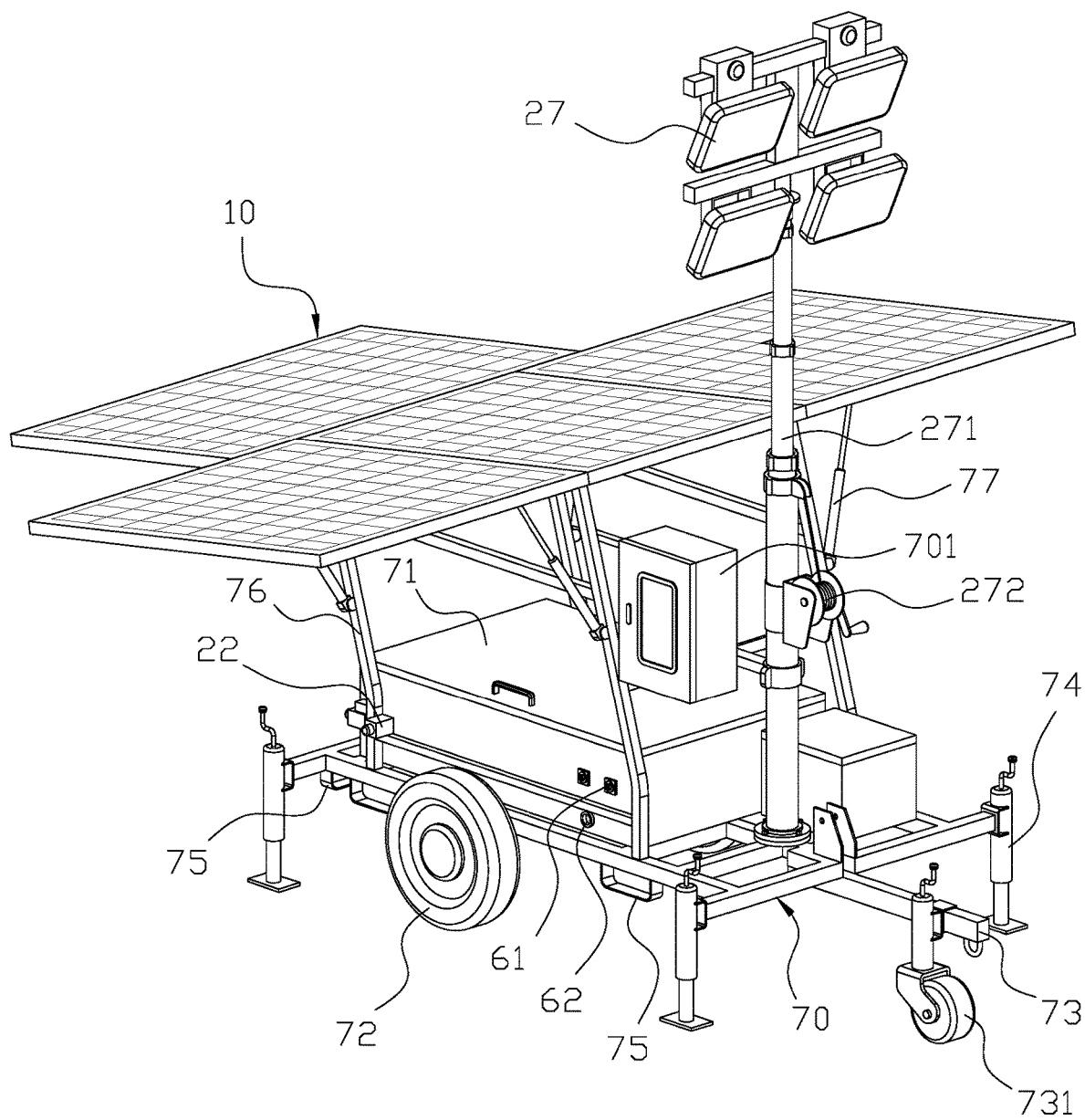
FIG. 4 is a three-dimensional assembly view illustrating the trailer enables the movable solar power apparatus of the present invention to firmly stand on the floor.
Figure 5:
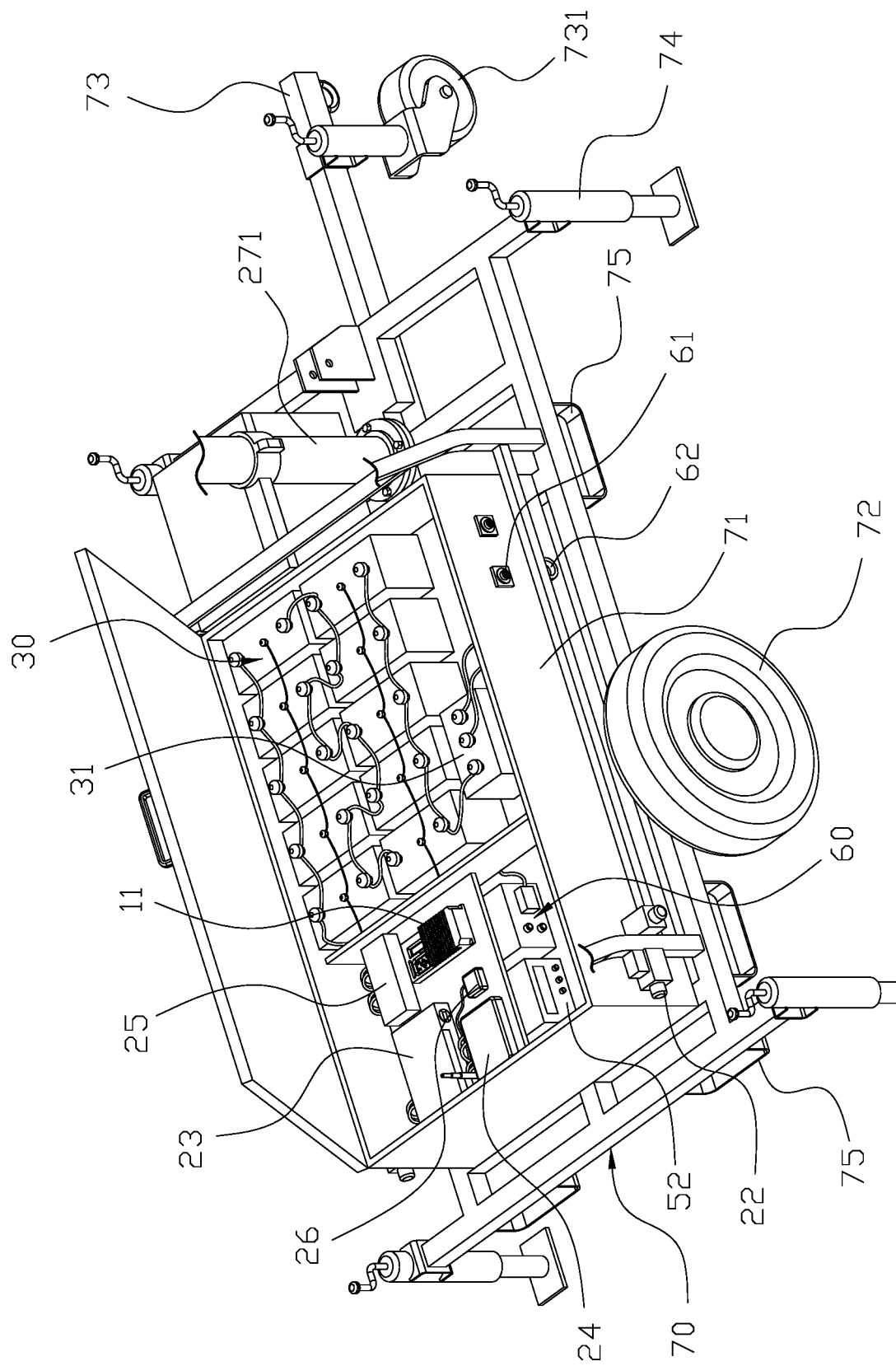
FIG. 5 is a three-dimensional assembly view of an interior configuration of a box of the movable solar power apparatus of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 5, the present invention provides a movable solar power apparatus which comprises at least a solar panel set (10), at least a DC load (20), a lithium battery set (30), a low potential wake-up circuit (40), a zero potential wake-up circuit (50) and an inverter (60). The solar panel set (10) is electrically connected to a maximum power point tracking system (MPPT) (11), and the MPPT (11) is electrically connected to a master control circuit (12) and the DC load (20). In one embodiment, the solar panel set (10) has four solar panels, and two solar panels are electrically connected in series forming two series arrangement and the two series arrangement are electrically connected in parallel, which enables the solar panel set (10) to generate 110V direct current (DC), and the output current is between 8 A and 24 A. Also, the MPPT (11) is configured to convert the generated DC from 110V to 48V for electricity demand of the DC load (20). Meanwhile, the MPPT (11) is adapted to improve the power generation efficiency of the solar panel set (10). The lithium battery set (30) is electrically connected to a battery management system (BMS) (31), and in one embodiment, the lithium battery set (30) has ten lithium batteries which are electrically two-series and five-parallel connected to form 48V. The BMS (31) is configured to monitor and protect the lithium battery set (30) from overcharging and over-discharging, and the BMS (31) is electrically connected to the MPPT (11) to enable power generated by the solar panel set (10) to directly charge the lithium battery set (30). Moreover, the lithium battery set (30) is adapted to provide power to DC load (20). The DC load (20) comprises a DC-DC converter (21) which is configured to convert DC from 48V to 12V. Furthermore, a monitors system (22) is electrically connected to the DC load (20) through the DC-DC converter (21) to get power. Also, the monitors system (22) is electrically connected to an internet sharer (23), a wireless router (24), and a monitor host (25) in series, and the monitor host (25) is electrically connected to the DC-DC converter (21). The internet sharer (23) is adapted to converge image signals from the monitors system (22), and through the wireless router (24), the image signals are configured to be saved in the monitor host (25). In addition, by connecting with a mobile device such as cellphone, notebook, and tablet through wireless method like Wi-Fi, the wireless router (24) is adapted to share and transmit real-time image signals to the connected mobile device which can provide real-time image signals to a user, thereby achieving the monitoring effect. Moreover, the wireless router (24) is electrically connected to a GPS system (26) which is adapted to locate the GPS coordinates of the movable solar power apparatus so as to achieve the effects of location searching, instant supporting and integration controlling. The low potential wake-up circuit (40) has a double-contact relay (41) and a single-contact relay (42), and the double-contact relay (41) comprises a main contact (411), a first contact (412), and a second contact (413). The main contact (411) is switchably electrically connected to the first contact (412) or the second contact (413), and the main contact (411) is electrically connected to the BMS (31) while the first contact (412) is electrically connected to the master control circuit (12), and the MPPT (11) is electrically connected to the BMS (31) under normal condition. Furthermore, the single-contact relay (42) is electrically connected to the solar panel set (10) at one end and electrically connected to the second contact (413) at the other end. When the main contact (411) and the first contact (412) of the double-contact relay (41) is electrically connected, the single-contact relay (42) is configured to cut off the low potential wake-up circuit (40) due to voltage difference of both ends. On the other hand, when the double-contact relay (41) switches its electrical connection to enable the main contact (411) to electrically connect to the second contact (413), the single-contact relay (42) is adapted to be electrically connected to the low potential wake-up circuit (40) due to voltage difference at both ends. The zero potential wake-up circuit (50) comprises a zero potential relay (51), and two ends thereof are respectively electrically connected to a UPS system (52) and the master control circuit (12). When the lithium battery set (30) is completely out of electricity, the double-contact relay (41) is configured to keep the main contact (411) electrically connecting to the first contact (412), and the UPS system (52) is adapted to provide power to the zero potential relay (51) so as to wake up the MPPT (11) and the BMS (31), thereby charging the lithium battery set (30). The inverter (60) electrically connected to the master control circuit (12) is configured to convert DC from the lithium battery set (30) to alternating current (AC). Also, the inverter (60) is adapted to electrically connect to at least an output connector (61) to provide AC load for external supply. Moreover, the output connector (61) of the inverter (60) is adapted to provide 220V AC to an electric car (63) for power supply. Furthermore, the inverter (60) is electrically connected to an input connector (62) which is configured to electrically connect to external AC, and the inverter (60) is configured to convert the external AC to DC, thereby charging the lithium battery set (30). In addition, when the lithium battery set (30) is completely out of electricity, the UPS system (52) is adapted to reboot the inverter (60) and the BMS (31) so as to convert external AC to DC to charge the lithium battery set (30).

Referring to FIGS. 1 to 5, the lithium battery set (30) is installed in a box (71) which is secured on a trailer (70). The trailer (70) comprises a plurality of wheels (72) to enable the trailer (70) to be movable, and the box (71) is also provided for accommodating the MPPT (11), the DC load (20), the low potential wake-up circuit (40), the BMS (31), the UPS system (52), and the inverter (60). Moreover, a control cabinet (701) secured on the trailer (70) is electrically connected to the MPPT (11) and the BMS (31), thereby achieving the functions of operation and supervision for the movable solar power apparatus. Additionally, a foldable pulling bar (73) extended from an end of the trailer (70) has an auxiliary wheel (731) such that a user is configured to pull the pulling bar (73) to move the trailer (70). Furthermore, each of four corners of the trailer (70) has a manual supporter (74) and an elevated rack (75), and the manual supporter (74) is adapted to be extended and firmly stand on the floor so as to prevent the trailer (70) from sliding or tilting. Moreover, the elevated rack (75) is configured to lift the trailer (70) so as to enable a stacker to move the trailer (70) (not shown in FIGs.). The DC load (20) is electrically connected to a plurality of lighting units (27), and in one embodiment, each of the lighting units (27) is a light-emitting diode. The MPPT (11) is configured to directly provide 48V DC to each of the lighting units (27), and the lighting units (27) are installed at an upper end of a telescopic column (271) while a lower end of the telescopic column (271) is secured on the trailer (70). Furthermore, a rope puller (272) installed on the telescopic column (271) is adapted to control the telescopic motion of the telescopic column (271), and a plurality of upright posts (76) are formed at a periphery of the box (71). The solar panel set (10) are installed at upper ends of the upright posts (76) to achieve shading effect for the box (71), thereby preventing an inside of the box (71) from overheating. Moreover, each of pneumatic rods (77) installed between the upright post (76) and the solar panel set (10) is adapted to push and position the solar panel set (10) on the same plane.

With the pulling bar (73), the auxiliary wheel (731), and the wheels (72), the trailer (70) can be moved easily to a power shortage location such as hills, coastal areas and emergency sites, and be secured at a position through the manual supporters (74). Thereafter, a user can operate the pneumatic rods (77) to unfold the solar panel set (10) to receive more sunlight. A user can turn on the monitors system (22) and the GPS system (26), and check power generation and electricity information through the control cabinet (701), and through the wireless router (24) connected to the mobile device, the user also can have real-time image signals on the mobile device, thereby achieving the monitoring effect. When the movable solar power apparatus is under a poor lighting environment, the rope puller (272) is operated to extend the telescopic column (271) so as to raise the lighting units (27) to light up the environment, thereby getting better images from the monitors system (22). The DC load (20) is adapted to enable the movable solar power apparatus to achieve the effect of real-time monitoring, GPS locating, wireless network sharing and environment lighting. Also, through controlling MPPT (11), the movable solar power apparatus can have direct current from the solar panel set (10) or the lithium battery set (30) to improve the electricity efficiency and realize the functions mentioned above. Moreover, the movable solar power apparatus has the inverter (60), and through the input connector (62) thereof connecting to external AC, the inverter (60) is configured to convert input AC to DC for power demand of the movable solar power apparatus. Additionally, the inverter (60) comprises the output connector (61) which is configured to electrically connect to an external device such as the electric car (63), and the inverter (60) is adapted to convert DC from the solar panel set (10) or the lithium battery set (30) to 110V or 220V AC, thereby providing power to the external device through the output connector (61).

Figure 6:
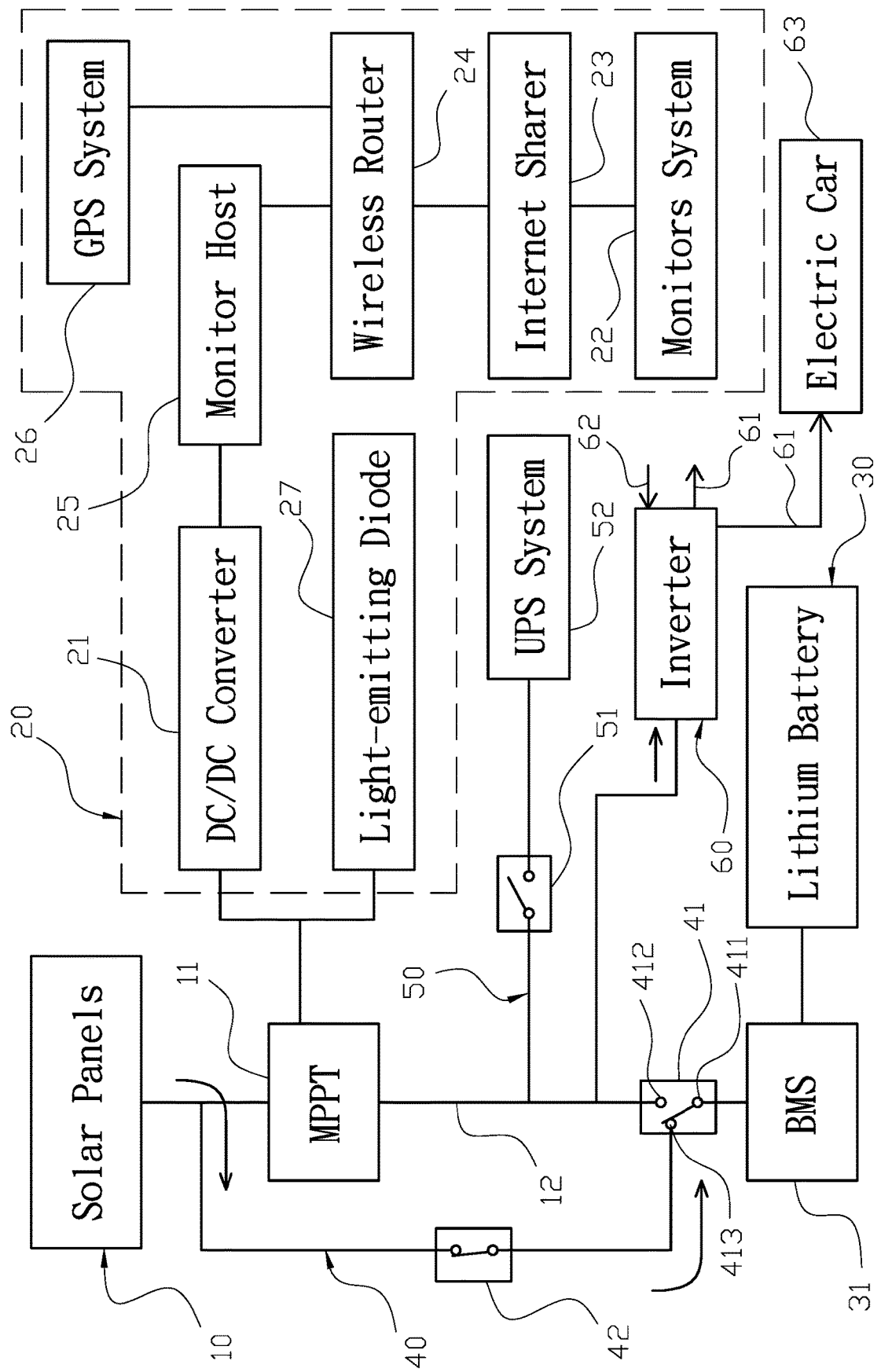
FIG. 6 is a circuit diagram of the movable solar power apparatus of the present invention when a low potential wake-up circuit charges the lithium battery set.
Figure 7:
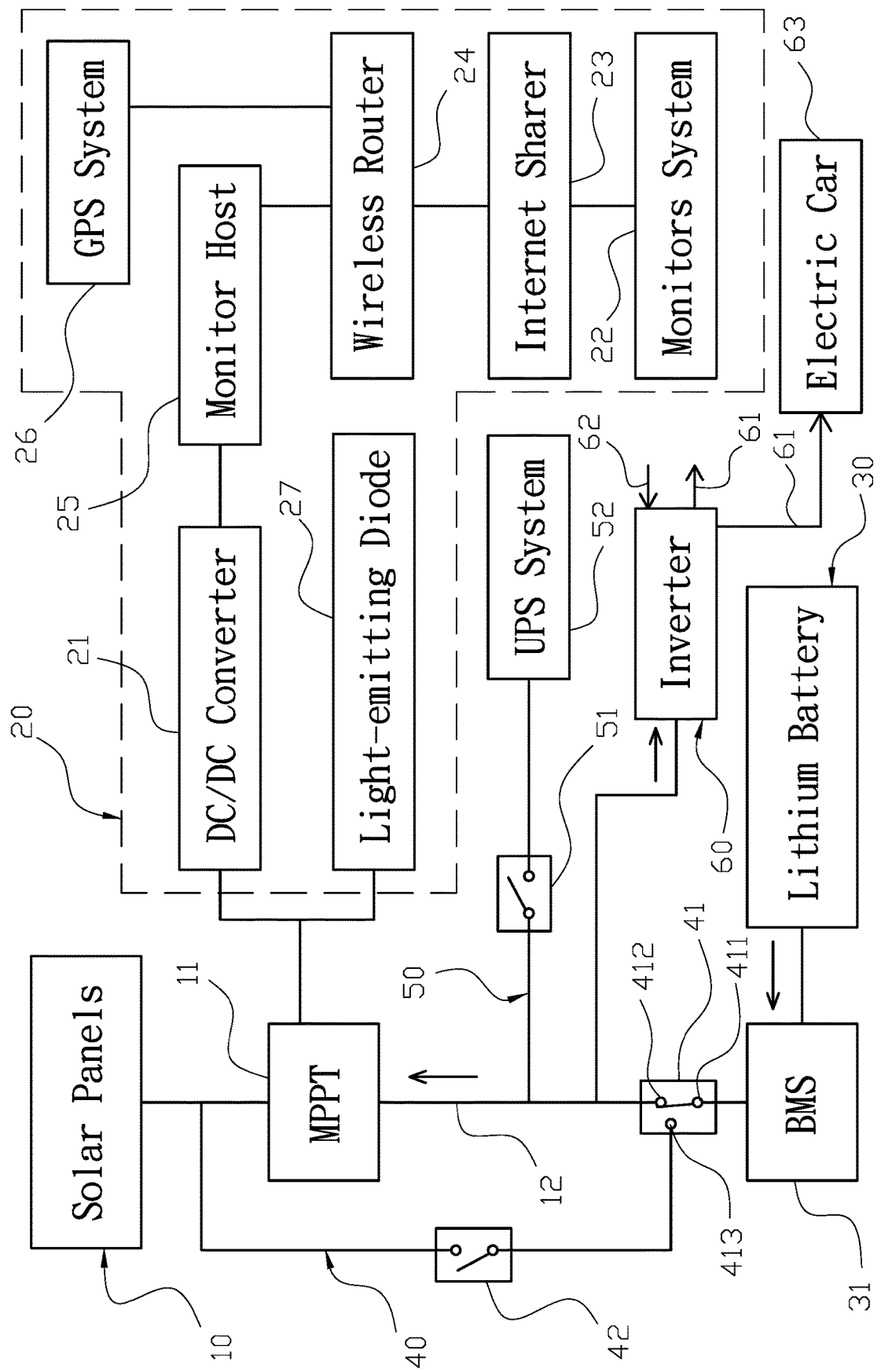
FIG. 7 is a circuit diagram of the movable solar power apparatus of the present invention when a maximum power point tracking system (MPPT) is rebooted to charge the lithium battery set.

In actual application, referring to FIGS. 1, 3, 4 and 5, the solar panel set (10) can generate 110V DC, and the generated DC is configured to be converted to 48V DC through the MPPT (11) to provide power to the DC load (20) or to be converted to AC through the inverter (60) to provide power to an external device, and remaining electricity is adapted to pass through the main contact (411) and the first contact (412) of the double-contact relay (41) to the BMS (31) which is configured to store the remaining electricity in the lithium battery set (30). When the solar panel set (10) is not generating power, referring to FIG. 2, the lithium battery set (30) is adapted to directly provide 48V DC to the MPPT (11) and the inverter (60), such that the MPPT (11) can provide power to the DC load (20) and the inverter (60) can provide power to an external device. When the lithium battery set (30) is at low electrical potential due to over-discharging, the BMS (31) is configured to automatically enter into sleep mode, wherein the value of the low electrical potential can be a theoretical value that the lithium battery set (30) is vulnerable to damage when the electrical potential is below or can be a desired value set by a user. Meanwhile, when the BMS (31) is in sleep mode, there is no power providing for the MPPT (11) and the inverter (60) such that the electricity from solar panel set (10) cannot be used through the MPPT (11). Therefore, referring to FIGS. 6 and 7, one of technical features of the present invention is the low potential wake-up circuit (40), wherein one end of the single-contact relay (42) of the low potential wake-up circuit (40) is electrically connected to the solar panel set (10) while the other end of thereof is electrically connected to the second contact (413) of the double-contact relay (41). Thus, when the lithium battery set (30) does not provide power to the double-contact relay (41), the double-contact relay (41) is adapted to switch its electrical connection to enable the main contact (411) to electrically connect to the second contact (413). In this moment, the voltage difference between the lithium battery set (30) and the DC generated by the solar panel set (10) is configured to enable the generated DC to pass through the single-contact relay (42) of the low potential wake-up circuit (40), thereby waking up the BMS (31) and charging the lithium battery set (30) through the low potential wake-up circuit (40). When the lithium battery set (30) is charged back to normal electrical potential and free from the over-discharging protection from the BMS (31), the double-contact relay (41) is configured to switch back its electrical connection to enable the main contact (411) to electrically connect to the first contact (412), thereby rebooting the MPPT (11) and the inverter (60). As a result, the electricity generated by the solar panel set (10) is adapted to pass through the MPPT (11) to charge the lithium battery set (30), and the voltage difference between the lithium battery set (30) and the solar panel set (10) is configured to cut off the low potential wake-up circuit (40) so as to enable the solar panel set (10) and the lithium battery set (30) back to the normal use condition.

Figure 8:
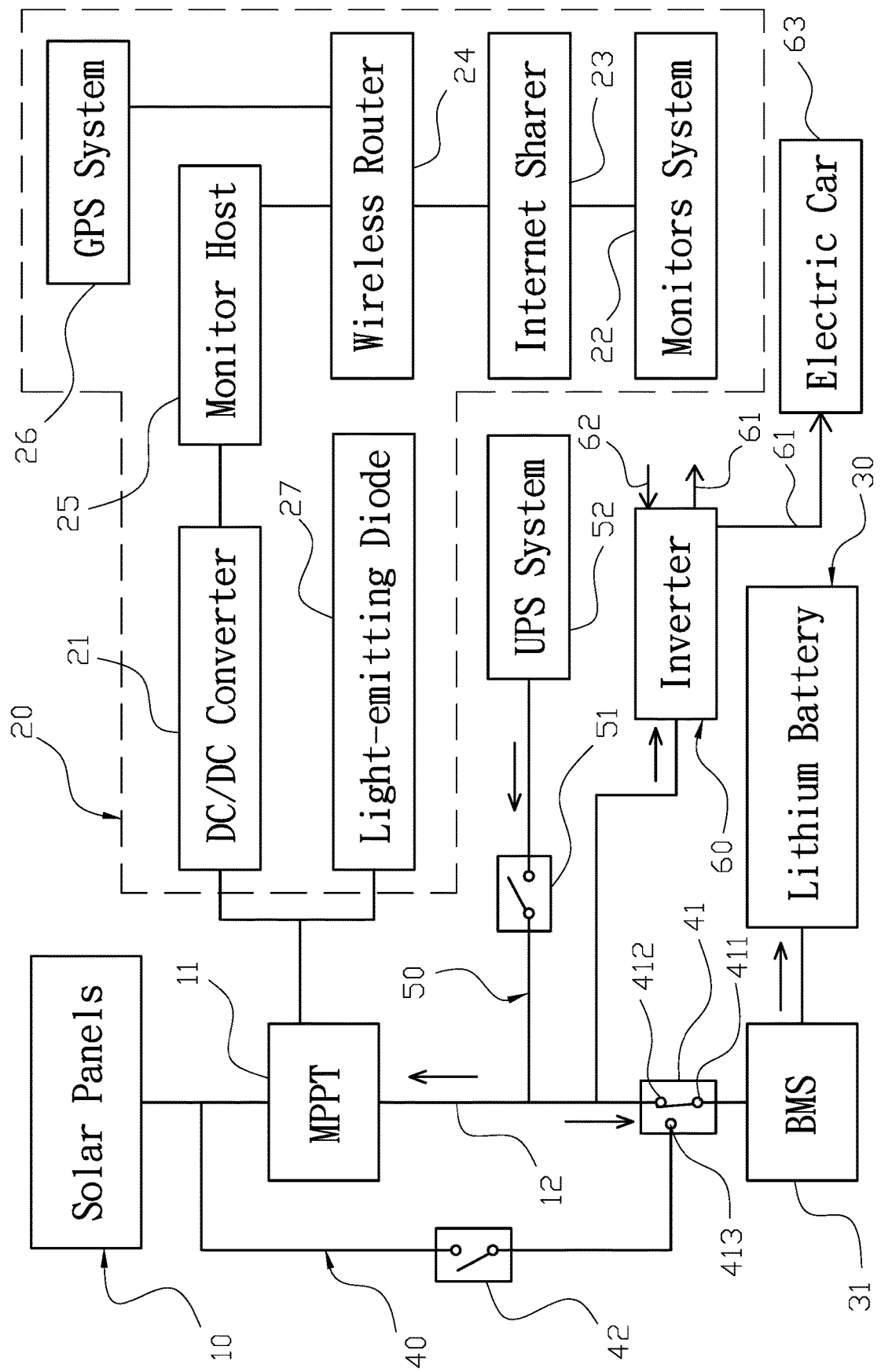
FIG. 8 is a circuit diagram of the movable solar power apparatus of the present invention when a zero potential wake-up circuit charges the lithium battery set.

In case that the low potential wake-up circuit (40) can not enable the solar panel set (10) to directly charge the lithium battery set (30) and the lithium battery set (30) is almost dead. Referring to FIG. 8, another technique features of the present invention is the zero potential wake-up circuit (50), wherein one end of the zero potential relay (51) of the zero potential wake-up circuit (50) is electrically connected to the UPS system (52) while the other end thereof is electrically connected to the master control circuit (12). When the UPS system (52) detects the lithium battery set (30) is completely dead, the main contact (411) is electrically connected to the first contact (412), and electricity stored in the UPS system (52) is adapted to pass through and provide power to the zero potential relay (51), thereby waking up the BMS (31), the MPPT (11), and the inverter (60). As a result, the solar panel set (10) is configured to charge the lithium battery set (30) until the voltage difference between the solar panel set (10) and the lithium battery set (30) cuts off the zero potential wake-up circuit (50). Moreover, the lithium battery set (30) is configured to back to the normal use condition, and the low potential wake-up circuit (40) is adapted to shut off the over-discharging protection of the BMS (31). As mentioned above, the movable solar power apparatus of the present invention has two-stage automatic wake-up system, which enables the MPPT (11) and the lithium battery set (30) to be rebooted when the lithium battery set (30) is low or even dead.

Having described the invention by the description and illustrations above, it should be understood that these are exemplary of the invention and are not to be considered as limiting. Accordingly, the invention is not to be considered as limited by the foregoing description, but includes any equivalents.

What is claimed is:
1. A movable solar power apparatus comprising:
at least a solar panel set electrically connected to a maximum power point tracking system (MPPT) which is electrically connected to a master control circuit and at least a DC load; the solar panel set configured to generate direct current (DC), and MPPT adapted to drop voltage of the generated DC to provide power to the DC load;
a lithium battery set electrically connected to a battery management system (BMS) which is configured to monitor and protect the lithium battery set from overcharging and over-discharging;

a low potential wake-up circuit having a double-contact relay and a single-contact relay, and the double-contact relay comprising a main contact, a first contact, and a second contact; the main contact switchably electrically connected to the first contact or the second contact, and the main contact electrically connected to the BMS while the first contact electrically connected to the master control circuit, and the MPPT electrically connected to the BMS under normal condition; the single-contact relay electrically connected to the solar panel set at one end and electrically connected to the second contact at the other end; when the main contact and the first contact of the double-contact relay electrically connected, the single-contact relay configured to cut off the low potential wake-up circuit; when the double-contact relay switching the electrical connection thereof to enable the main contact to electrically connect to the second contact, the single-contact relay adapted to be electrically connected to the low potential wake-up circuit;

a zero potential wake-up circuit comprising a zero potential relay, and two ends thereof respectively electrically connected to a UPS system and the master control circuit; when the lithium battery set being completely out of electricity, the double-contact relay configured to keep the main contact electrically connecting to the first contact, and the UPS system adapted to provide power to the zero potential relay so as to wake up the MPPT and the BMS; and an inverter, which is electrically connected to the master control circuit, configured to convert DC from the lithium battery set to alternating current (AC), and the inverter adapted to electrically connect to at least an output connector to provide AC load for external supply.

2. The movable solar power apparatus of claim 1, wherein the inverter is electrically connected to an input connector which is configured to electrically connect to external AC, and the inverter is adapted to convert the external AC to DC, thereby charging the lithium battery set; when the lithium battery set is completely out of electricity, the UPS system is adapted to reboot the inverter and the BMS so as to convert external AC to DC to charge the lithium battery set.

3. The movable solar power apparatus of claim 1, wherein the lithium battery set is installed in a box which is secured on a trailer; the trailer comprises a plurality of wheels to enable the trailer to be movable, and the box is also provided for accommodating the MPPT, the DC load, the low potential wake-up circuit, the BMS, the UPS system, and the inverter.

4. The movable solar power apparatus of claim 3, wherein a foldable pulling bar extended from an end of the trailer has an auxiliary wheel such that a user is configured to pull the pulling bar to move the trailer; each of four corners of the trailer has a manual supporter and an elevated rack, and the manual supporter is adapted to be extended and firmly stand on the floor while the elevated rack is configured to lift the trailer so as to enable a stacker to move the trailer.

5. The movable solar power apparatus of claim 3, wherein the DC load is electrically connected to a plurality of lighting units, and the MPPT is configured to directly provide 48V DC to each of the lighting units; the lighting units are installed at an upper end of a telescopic column while a lower end of the telescopic column is secured on the trailer, and a rope puller installed on the telescopic column is adapted to control the telescopic motion of the telescopic column.

6. The movable solar power apparatus of claim 3, wherein a plurality of upright posts are formed at a periphery of the box, and the solar panel set are installed at upper ends of the upright posts and positioned above the box, and each of pneumatic rods installed between the upright post and the solar panel set is adapted to push and position the solar panel set on the same plane.

7. The movable solar power apparatus of claim 1, wherein the DC load comprises a DC-DC converter which is configured to convert input DC to 12V DC, and a monitors system is electrically connected to the DC load through the DC-DC converter to get power.

8. The movable solar power apparatus of claim 7, wherein the monitors system is electrically connected to an internet sharer, a wireless router, and a monitor host in series, and the monitor host is electrically connected to the DC-DC converter; the internet sharer is adapted to converge image signals from the monitors system, and through the wireless router, the image signals are configured to be saved in the monitor host and to be transmitted to a connected device, thereby achieving the monitoring effect.

9. The movable solar power apparatus of claim 8, wherein the wireless router is electrically connected to a GPS system which is adapted to locate the GPS coordinates of the movable solar power apparatus.

10. The movable solar power apparatus of claim 1, wherein the output connector of the inverter is adapted to provide 220V AC to an electric car for power supply.

* * * * *